US012549130B2

(12) United States Patent
Sagong (10) Patent No.: US 12,549,130 B2
(45) Date of Patent: Feb. 10, 2026

(54) HYBRID PANEL AND HYBRID PANEL ABNORMALITY DIAGNOSIS SYSTEM INCLUDING SAME

(71) Applicant: KUKDONG ENERGY Corp, Gyeongsangbuk-do (KR)

(72) Inventor: Myeong Geon Sagong, Gyeongsangbuk-do (KR)

(73) Assignee: KUKDONG ENERGY Corp, Gyeongsangbuk-do (KR)

( * ) Notice: Subject to any disclaimer, the term of this patent is extended or adjusted under 35 U.S.C. 154(b) by 57 days.

(21) Appl. No.: 18/236,387

(22) Filed: Aug. 21, 2023

(65) Prior Publication Data

US 2024/0204725 A1 Jun. 20, 2024

(30) Foreign Application Priority Data

Dec. 20, 2022 (KR) .................. 10-2022-0179540

(51) Int. Cl.
*H02S 50/10* (2014.01)
*H02S 40/42* (2014.01)

(52) U.S. Cl.
CPC ............ *H02S 50/10* (2014.12); *H02S 40/425* (2014.12)

(58) Field of Classification Search
CPC ......... H02S 40/425; H02S 50/10; Y02E 10/50
See application file for complete search history.

(56) References Cited

U.S. PATENT DOCUMENTS

2010/0322784 A1* 12/2010 Rubio .................... H02S 40/44
126/643
2018/0342979 A1* 11/2018 Joardar .................. H02S 40/42
2022/0252357 A1* 8/2022 Alley ..................... F24F 12/00

FOREIGN PATENT DOCUMENTS

JP         2017166783 A  *  9/2017
KR  10-2019-0066135 A      6/2019

* cited by examiner

*Primary Examiner* — Judy Nguyen
*Assistant Examiner* — Adam S Clarke
(74) *Attorney, Agent, or Firm* — Revolution IP, PLLC

(57) ABSTRACT

A hybrid panel abnormality diagnosis system includes a solar photovoltaic panel generating electrical energy by receiving sunlight, a solar thermal panel which is formed on a lower portion of the solar photovoltaic panel and in which a refrigerant flow path where a refrigerant for cooling the solar photovoltaic panel by absorbing heat generated as sunlight irradiates the solar photovoltaic panel flows is formed and which has a temperature sensor unit measuring and collecting a refrigerant temperature difference between an inlet port and an outlet port of the refrigerant flow path, and an abnormality diagnosis server diagnosing whether the solar photovoltaic panel is abnormal.

7 Claims, 5 Drawing Sheets

HYBRID PANEL AND HYBRID PANEL ABNORMALITY DIAGNOSIS SYSTEM INCLUDING SAME

CROSS REFERENCE TO RELATED APPLICATION

The present application claims priority to Korean Patent Application No. 10-2022-0179540, filed Dec. 20, 2022, the entire contents of which are incorporated herein for all purposes by this reference.

BACKGROUND OF THE INVENTION

Field of the Invention

The present disclosure relates to a hybrid panel and a hybrid panel abnormality diagnosis system diagnosing whether a solar photovoltaic panel is abnormal, on the basis of a temperature difference of a refrigerant flowing along a refrigerant flow path of a solar thermal panel formed on a lower portion of the solar photovoltaic panel.

Description of the Related Art

Currently, as the need for various environmental regulations for preservation of the environment, the risk of existing energy generation facilities such as thermal power generation and nuclear power generation, and problems due to the emission of various pollutions have emerged, new and renewable energy is being greatly highlighted. Among these new and renewable energies, power generation using sunlight is the most popular, and a hybrid panel is generally used in the power generation facility using sunlight. Furthermore, the power generation facility using sunlight has low construction cost and high construction convenience.

However, since the solar photovoltaic panel generates power through sunlight, the solar photovoltaic panel is required to be mounted outside. Accordingly, the solar photovoltaic panel may be exposed to an environment in various inclement weather conditions, so that a defect due to damage during an operation process of the solar photovoltaic panel may occur. In addition, in order to generate a large amount of power, a number of solar photovoltaic panels are operated. When the number of solar photovoltaic panels that have a defect is accumulated, power generation efficiency is greatly reduced. Accordingly, it is necessary to quickly detect the solar photovoltaic panel in which such a defect occurs and to support maintenance.

As a conventional maintenance method for the solar photovoltaic panel, there is a method in which a maintenance person holds a thermal imaging camera directly and photographs the solar photovoltaic panels one by one. In this case, there is an advantage that a solar photovoltaic module can be accurately viewed up close, but photographing takes a lot of time and expenses. In a condition where solar radiation of 600 KW/m$^2$ occurs, which is suitable for photographing the solar photovoltaic module, more manpower and more time are required. In addition, more time is required for an expert to check the entire module, and overall problems in a string or an array unit are difficult to be checked.

In addition, in the manual maintenance method, the cost of the maintenance is increased even more since access to the solar photovoltaic panel is difficult. In order to solve this problem, an imaging method using a drone has been recently introduced, and this method is operated such that a manager directly checks a video obtained through the drone and the manager finds a defective solar photovoltaic panel.

Document of Related Art (Patent Document 1) Korean Patent Application Publication No. 10-2019-0066135

SUMMARY OF THE INVENTION

Accordingly, the present disclosure has been made keeping in mind the above problems occurring in the related art, and an objective of the present disclosure is to provide a hybrid panel and a hybrid panel abnormality diagnosis system diagnosing whether a solar photovoltaic panel is abnormal, on the basis of a temperature difference of a refrigerant flowing along a refrigerant flow path of a solar thermal panel formed on a lower portion of the solar photovoltaic panel.

According to an embodiment of the present disclosure, there is provided a hybrid panel abnormality diagnosis system including: a solar photovoltaic panel configured to generate electrical energy by receiving sunlight; a solar thermal panel which is formed on a lower portion of the solar photovoltaic panel and in which a refrigerant flow path where a refrigerant for cooling the solar photovoltaic panel by absorbing heat generated as sunlight irradiates the solar photovoltaic panel flows is formed, the solar thermal panel having a temperature sensor unit configured to measure and collect a difference in refrigerant temperature between an inlet port and an outlet port of the refrigerant flow path; and an abnormality diagnosis server configured to diagnose, on the basis of the difference in refrigerant temperature collected from the temperature sensor unit, whether the solar photovoltaic panel is abnormal.

In the hybrid panel abnormality diagnosis system according to an embodiment of the present disclosure, the temperature sensor unit may include: a first temperature sensor mounted in the inlet port and configured to measure a first temperature value of the introduced refrigerant; a second temperature sensor mounted in the outlet port and configured to measure a second temperature value of the discharged refrigerant; and a communicating unit configured to transmit the first temperature value and the second temperature value that are measured to the abnormality diagnosis server.

In the hybrid panel abnormality diagnosis system according to an embodiment of the present disclosure, the abnormality diagnosis server may include: a storage unit configured to store reference information for an abnormality diagnosis; and an abnormality diagnosis unit configured to calculate the difference in refrigerant temperature from a difference value between the first temperature value and the second temperature value, and configured to compare the calculated difference in refrigerant temperature with the reference information, thereby diagnosing whether the solar photovoltaic panel is abnormal.

In the hybrid panel abnormality diagnosis system according to an embodiment of the present disclosure, the reference information may be a range of an average value of the difference in refrigerant temperature obtained by repeatedly measuring multiple times the difference in refrigerant temperature of a plurality of the solar photovoltaic panels that is normal, and information obtained through repeated may be statistical experiments.

According to an embodiment of the present disclosure, there is provided a hybrid panel including: a solar photovoltaic panel configured to generate electrical energy by receiving sunlight; a solar thermal panel which is formed on a lower portion of the solar photovoltaic panel and in which a refrigerant flow path where a refrigerant for cooling the solar photovoltaic panel by absorbing heat generated as sunlight irradiates the solar photovoltaic panel flows is formed, the solar thermal panel having a temperature sensor unit configured to measure and collect a difference in refrigerant temperature between an inlet port and an outlet port of the refrigerant flow path, and the solar thermal panel having n abnormality diagnosis unit configured to diagnose, on the basis of the difference in refrigerant temperature that is measured, whether the solar photovoltaic panel is abnormal.

In the hybrid panel according to an embodiment of the present disclosure, the temperature sensor unit may include a first temperature sensor mounted in the inlet port and configured to measure a first temperature value of the introduced refrigerant, and may include a second temperature sensor mounted in the outlet port and configured to measure a second temperature value of the discharged refrigerant, and the abnormality diagnosis unit may include a memory storing reference information for an abnormality diagnosis, may be configured to calculate the difference in refrigerant temperature from a difference value between the first temperature value and the second temperature value, and may be configured to compare the calculated difference in refrigerant temperature with the reference information, thereby diagnosing whether the solar photovoltaic panel is abnormal.

In the hybrid panel according to an embodiment of the present disclosure, the reference information may be a range of an average value of the difference in refrigerant temperature obtained by repeatedly measuring multiple times the difference in refrigerant temperature of a plurality of the solar photovoltaic panels that is normal, and may be statistical information obtained through repeated experiments.

Other details of implementations according to various aspects of the present disclosure are included in the detailed description below.

According to an embodiment of the present disclosure, whether the solar photovoltaic panel is abnormal may be diagnosed on the basis of a temperature difference of the refrigerant flowing along the refrigerant flow path of the solar thermal panel formed on the lower portion of the solar photovoltaic panel.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

The present disclosure may be variously modified and may have various embodiments, and specific embodiments will now be described in detail. However, it should be understood that the specific embodiments according to the concept of the present disclosure are not limited to the embodiments which will be described hereinbelow with reference to the accompanying drawings, but all of modifications, equivalents, and substitutions are included in the scope and spirit of the present disclosure.

The terminology used herein is for the purpose of describing specific embodiments only and is not intended to limit the present disclosure. Singular expressions include plural expressions unless the context clearly indicates otherwise. It is to be understood that terms such as 'including', 'having', and so on are intended to indicate the existence of the features, numbers, steps, actions, elements, components, or combinations thereof disclosed in the specification, and are not intended to preclude the possibility that one or more other features, numbers, steps, actions, elements, components, or combinations thereof may exist or may be added. Hereinafter, a hybrid panel abnormality diagnosis system according to an embodiment of the present disclosure will be described with reference to drawings.

Figure 1:
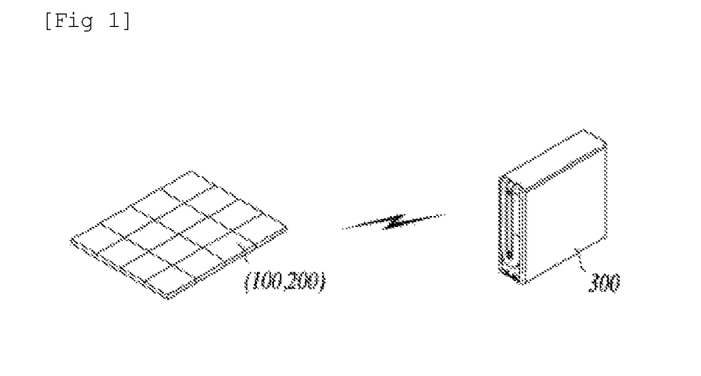
FIG. 1 is a view illustrating a hybrid panel abnormality diagnosis system according to an embodiment of the present disclosure.
Figure 2:
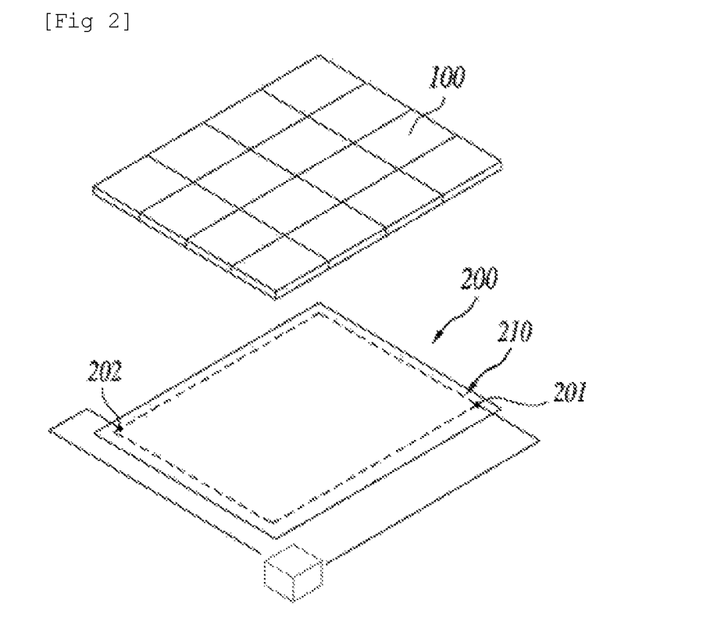
FIG. 2 is a perspective view illustrating a hybrid panel according to an embodiment of the present disclosure.

FIG. 1 is a view illustrating a hybrid panel abnormality diagnosis system according to an embodiment of the present disclosure, and FIG. 2 is a perspective view illustrating a hybrid panel according to an embodiment of the present disclosure.

Referring to FIG. 1 and FIG. 2, a hybrid panel abnormality diagnosis system according to an embodiment of the present disclosure includes a solar photovoltaic panel 100, a solar thermal panel 200, and an abnormality diagnosis server 300.

The solar photovoltaic panel 100 is a device configured to receive sunlight and to convert solar photovoltaic energy into electrical energy. Generally, the solar photovoltaic panel 100 is formed in a rectangular plate shape, has a plurality of solar photovoltaic cells disposed therein, and may be mounted slantly by a separate frame so as to efficiently receive sunlight.

The solar photovoltaic panel 100 may be configured as an aggregate of the solar photovoltaic cells that are a plurality of unit cells. In addition, the solar photovoltaic cell generally generates a voltage of 0.5 V to 0.6 V, i.e., an electric power of approximately 3 W to 4 W. In addition, the solar photovoltaic panel 100 including the plurality of unit solar photovoltaic cells generally has an output of approximately 16 V to 26 V, and approximately 120 W to 300 W.

The solar photovoltaic panel 100 may include a silicon solar cell panel, a dye-sensitized solar cell panel, a compound semiconductor solar cell panel, and a solar cell in a tandem-type solar photovoltaic panel. In addition, the solar photovoltaic panel 100 may include a tab line electrically connecting the plurality of solar cells to each other, glass positioned at an upper portion of the solar cell and configured to protect a component that is positioned inside the glass, a rear surface sheet positioned at a lower portion of the solar cell and configured to support a component that is positioned inside the rear surface sheet, and a bonding material supporting the solar cells, the glass, and the rear surface sheet, but there is no limitation. A detailed configuration of the solar photovoltaic panel 100 is a general configuration, so a detailed description thereof is omitted.

The solar thermal panel 200 is formed in a plate shape, is attached to a lower surface of the solar photovoltaic panel 100, and includes a refrigerant flow path 210 in which a refrigerant for cooling the solar photovoltaic panel 100 flows, the refrigerant absorbing heat generated as sunlight irradiates the solar photovoltaic panel 100.

The refrigerant flow path 210 is mounted in the solar thermal panel 200, may include an inlet port 201 into which the refrigerant is introduced, and may include an outlet port 202 to which the refrigerant is discharged. The temperature of the introduced refrigerant through the inlet port 201 may be increased while flowing along the refrigerant flow path 210, and the refrigerant of which the temperature is increased may be discharged through the outlet port 202.

The solar thermal panel 200 is in contact with a lower portion of the solar photovoltaic panel 100, and absorbs thermal energy generated as the solar photovoltaic panel 100 is heated, thereby being capable of heating the refrigerant flowing in the refrigerant flow path 210 formed within the solar thermal panel 200.

At this time, the refrigerant is a Freon gas-based refrigerant, and may be R-134A or R-407C, but is not limited thereto. Such a Freon gas-based refrigerant does not freeze at 40 degrees Celsius below zero and does not boil equal to or more than 100 degrees Celsius, so that frost is generated around a Freon gas-based refrigerant flow path even in summer. Therefore, the Freon gas-based refrigerant has an effect of effectively cooling the solar photovoltaic panel 100 even in summer. In addition, it is preferable that the solar thermal panel 200 is manufactured from a material that has a high thermal transfer efficiency in order to efficiently transfer heat.

Meanwhile, when an abnormality such as a hot spot that occurs in the solar photovoltaic panel 100 or a specific cell that constitutes the solar photovoltaic panel 100 occurs, the corresponding solar photovoltaic panel 100 or the specific cell emits thermal energy and display a temperature higher than a normal panel or a normal cell.

Conventionally, an abnormal panel or an abnormal cell having a high temperature has been detected and diagnosed by using a thermal image obtained by an unmanned aerial vehicle equipped with a thermal imaging camera photographing a solar photovoltaic panel. However, such a diagnosis method using the unmanned aerial vehicle has problems of setting a flight path of the unmanned aerial vehicle for inspecting the solar photovoltaic panel, inaccuracy of inspection due to weather conditions, inspection errors due to light reflection, and so on.

Accordingly, in the present disclosure, without using the unmanned aerial vehicle, a technology for diagnosing whether a solar photovoltaic panel is abnormal on the basis of a temperature change of a refrigerant flowing through a refrigerant flow path of the solar thermal panel formed on a lower portion of the solar photovoltaic panel is disclosed. In the following description, the solar photovoltaic panel 100 or a specific cell constituting the solar photovoltaic panel 100 is collectively referred to as the solar photovoltaic panel 100.

Figure 3:
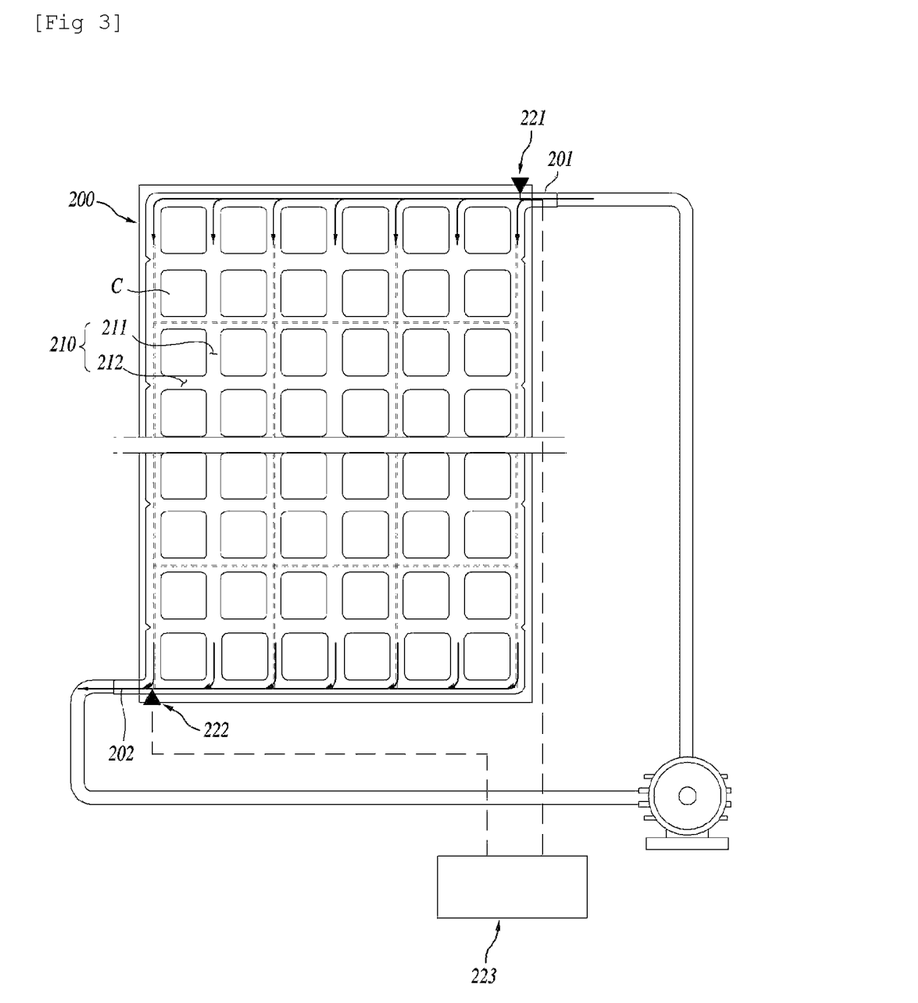
FIG. 3 is a view illustrating a solar thermal panel according to an embodiment of the present disclosure.

FIG. 3 is a view illustrating a solar thermal panel according to an embodiment of the present disclosure.

Referring to FIG. 3, the solar thermal panel 200 includes the refrigerant flow path 210 and a temperature sensor unit 220.

The refrigerant flow path 210 may be formed by connecting a plurality of metal pipes to each other such that a plurality of longitudinal flow paths 211 and a plurality of transverse flow paths 212 are formed and a lattice shape is formed. In FIG. 3, the refrigerant flow path 210 including seven longitudinal flow paths 211 and nine transverse flow paths 212 is illustrated, but the number of the longitudinal flow paths 211 and the number of the transverse flow paths 212 are not limited thereto. The metal pipes constituting the longitudinal flow path 211 and the transverse flow path 212 are provided with a material having excellent thermal conductivity. Reference numeral C indicates the insulating material that is disposed on a region formed by the longitudinal flow path 211 and the transverse flow path 212.

A thermal paste is applied to a surface where the metal pipes are in contact with the solar photovoltaic cell that constitutes the solar photovoltaic panel 100, thereby improving adhesiveness of the solar photovoltaic cell and the thermal conductivity of the solar photovoltaic cell with the refrigerant flow path 210. In addition, the insulating material is at least partially formed on side surfaces and a lower surface of the refrigerant flow path 210, thereby preventing heat absorbed by the refrigerant from being discharged to the outside.

The temperature sensor unit 220 is configured to measure and collect a difference in refrigerant temperature between the inlet port 201 and the outlet port 202 of the refrigerant flow path 210.

Specifically, the temperature sensor unit 220 includes a first temperature sensor 221, a second temperature sensor 222, and a communicating unit 223.

The first temperature sensor 221 is mounted in the inlet port 201 and measures a first temperature value of the introduced refrigerant, the second temperature sensor 222 is mounted in the outlet port 202 and measure a second temperature value of the refrigerant that is discharged through the outlet port 202 after the refrigerant absorbs heat while flowing along the refrigerant flow path 210. The communicating unit 223 is configured to transmit the first and second temperature values measured by the first temperature sensor 221 and the second temperature sensor 222 to the abnormality diagnosis server 300.

Figure 4:
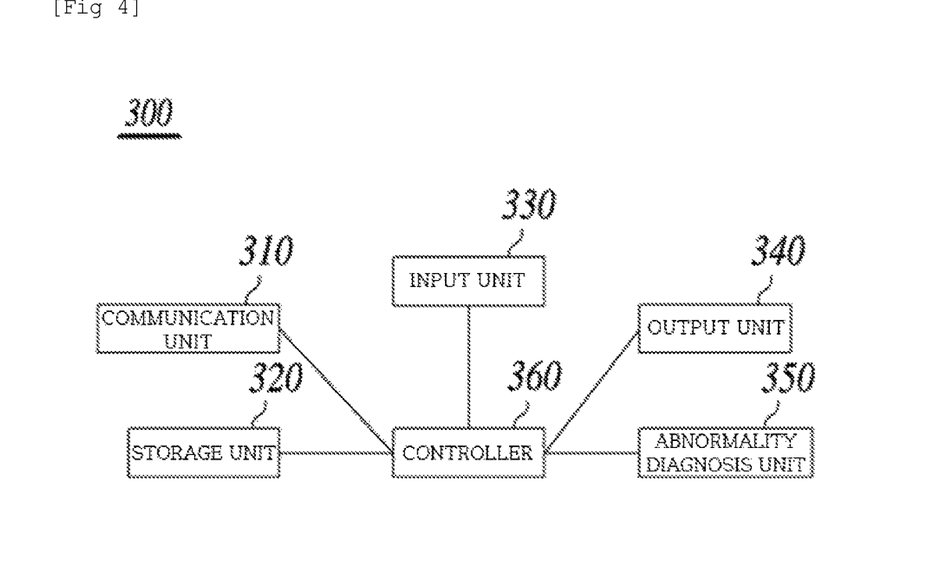
FIG. 4 is a block diagram illustrating an abnormality diagnosis server according to an embodiment of the present disclosure.

FIG. 4 is a block diagram illustrating an abnormality diagnosis server according to an embodiment of the present disclosure.

Referring to FIG. 4, the abnormality diagnosis server 300 includes a communication unit 310, a storage unit 320, an input unit 330, an output unit 340, an abnormality diagnosis unit 350, and a controller 360.

The communication unit 310 communicates with the communicating unit 323 through a communication network, and receives the first temperature value, the second temperature value, and so on transmitted from the communicating unit 323.

The storage unit 320 is configured to store data, programs, and so on required for operating the abnormality diagnosis server 300. In addition, the storage unit 320 may store reference information for an abnormality diagnosis. The reference information may be a range (reference range) of a refrigerant temperature difference in a normal solar photovoltaic panel. The reference information may be statistical information obtained through repeated experiments. For example, the reference information may be an average value of the refrigerant temperature difference (the second temperature value—the first temperature value) obtained by repeatedly measuring the first temperature value of the first temperature sensor 221 the second temperature value of the second temperature sensor 222 on the plurality of normal solar photovoltaic panels. This average value may vary according to external environmental factors such as a sun altitude/weather and so on, and may be an average value of a predetermined range obtained through the same/similar process in each external environment.

The input unit 330 may be configured to receive a signal according to a button operation by a user input or a selection of an arbitrary function, or may be configured to receive a command or a control signal generated by a user input such as touching/scrolling a displayed screen. Furthermore, the input unit 33 may provide an input signal related to a user input to the controller 360.

The output unit 340 displays various contents such as various menu screens by using a user interface and/or a graphical user interface.

When an abnormality such as a hot spot that occurs in the solar photovoltaic panel 100 occurs, the corresponding solar photovoltaic panel 100 emits thermal energy, and the thermal energy causes the temperature of the refrigerant flowing through the refrigerant flow path 210 of the solar thermal panel 200 in contact with and mounted at a lower surface of the solar photovoltaic panel 100 to be increased. The abnormality diagnosis unit 350 uses this principle and diagnoses, on the basis of the refrigerant temperature difference, whether the solar photovoltaic panel 100 is abnormal.

That is, the abnormality diagnosis unit 350 calculates the refrigerant temperature difference (the second temperature value—the first temperature value) from the difference between the first temperature value and the second temperature value received from the communication unit 310, and compares the calculated refrigerant temperature difference with the reference information to diagnose whether the solar photovoltaic panel 100 is abnormal.

Specifically, the abnormality diagnosis unit 350 reads the reference information for the abnormality diagnosis, the reference information being stored in the storage unit 320. The reference information may be a range (reference range) of an average value of a refrigerant temperature difference (the second temperature value—the first temperature value) obtained by repeatedly measuring the first and second temperature values of a plurality of normal solar photovoltaic panels. The abnormality diagnosis unit 350 diagnoses whether the calculated refrigerant temperature difference falls within the reference range, diagnoses that the panel is normal when the calculated refrigerant temperature difference falls within the reference range, and diagnoses that the panel is abnormal when the calculated refrigerant temperature difference is less than the reference range.

Figure 5:
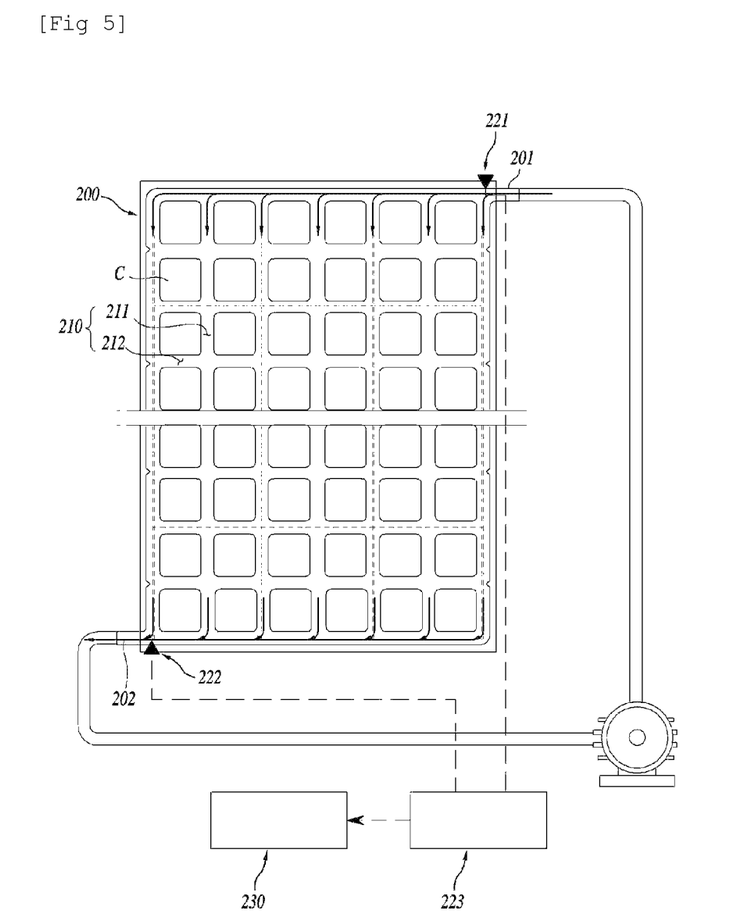
FIG. 5 is a perspective view illustrating the solar thermal panel according to another embodiment of the present disclosure.

FIG. 5 is a perspective view illustrating the solar thermal panel according to another embodiment of the present disclosure.

Referring to FIG. 5, the solar thermal panel 200 according to another embodiment of the present disclosure includes the refrigerant flow path 210, the temperature sensor unit 220, and an abnormality diagnosis unit 230.

In the embodiment above, the abnormality diagnosis unit 350 is described as being implemented on the abnormality diagnosis server 300, but the abnormality diagnosis unit 350 does not necessarily have to be a single configuration of the abnormality diagnosis server 300. For example, as illustrated in FIG. 5, the solar thermal panel 200 may further include the abnormality diagnosis unit 230. In this case, the communicating unit 223 may transmit a diagnosis result of the abnormality diagnosis unit 230 to the abnormality diagnosis server 300. In this case, the abnormality diagnosis server 300 may serve only as a management server.

The abnormality diagnosis unit 230 includes a memory for storage, and reference information for the abnormality diagnosis may be stored in the memory. The reference information may be a range (reference range) of a refrigerant temperature difference in a normal solar photovoltaic panel. The reference information may be statistical information obtained through repeated experiments. For example, the reference information may be an average value of the refrigerant temperature difference (the second temperature value—the first temperature value) obtained by repeatedly measuring the first temperature value of the first temperature sensor 221 and the second temperature value of the second temperature sensor 222 on the plurality of normal solar photovoltaic panels. This average value may vary according to external environmental factors such as a sun altitude/weather and so on, and may be an average value of a predetermined range obtained through the same/similar process in each external environment.

The abnormality diagnosis unit 230 calculates the refrigerant temperature difference (the second temperature value—the first temperature value) from the difference between the first temperature value and the second temperature value received from the communicating unit 223, and compares the calculated refrigerant temperature difference with the reference information to diagnose whether the solar photovoltaic panel 100 is abnormal.

After the abnormality diagnosis unit 230 reads the reference information for the abnormality diagnosis stored in the memory, the abnormality diagnosis unit 230 determines whether the calculated refrigerant temperature difference falls within the reference range. In addition, the abnormality diagnosis unit 230 determines that the panel is normal when the calculated refrigerant temperature difference falls within the reference range, and determines that the panel is abnormal when the calculated refrigerant temperature difference falls outside the reference range.

Figure 6:
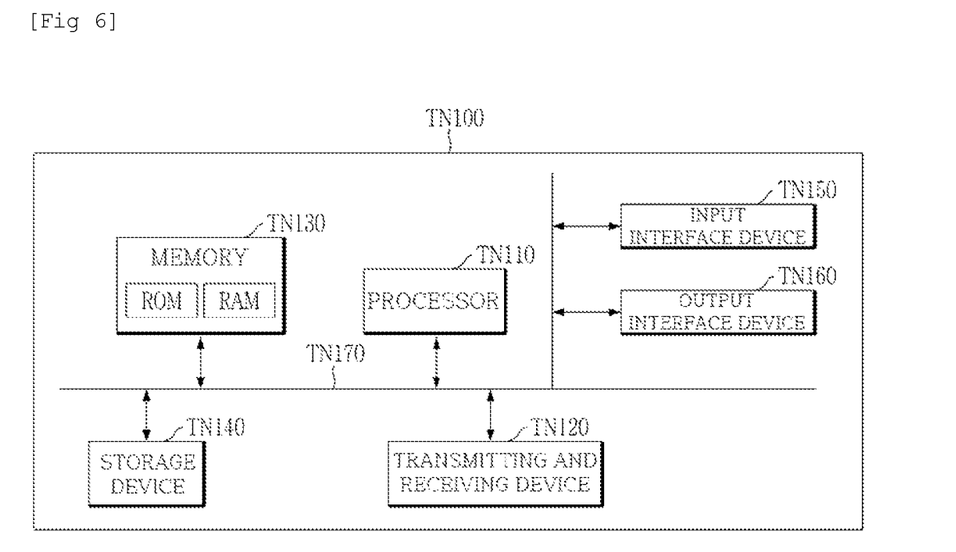
FIG. 6 is a view illustrating a computing device according to an embodiment of the present disclosure.

FIG. 6 is a view illustrating a computing device according to an embodiment of the present disclosure. A computing device TN100 in FIG. 6 may be a hardware configuration of the abnormality diagnosis server 300 or the abnormality diagnosis unit 230 described in this specification.

In the embodiment illustrated in FIG. 6, the computing device TN100 may include at least one processor TN110, and may include a transmitting and receiving device TN120, and a memory TN130. In addition, the computing device TN100 may further include a storage device TN140, an input interface device TN150, an output interface device TN160, and so on. The components included in the computing device TN100 may communicate with each other by being connected to each other with a bus TN170.

The processor TN110 may execute a program command stored in at least one of the memory TN130 and the storage device TN140. The processor TN110 may refer to a central processing unit (CPU), a graphics processing unit (GPU), or a dedicated processor in which methods according to an embodiment of the present disclosure are performed. The processor TN110 may be configured to implement procedures, functions, methods, and so on described in relation to an embodiment of the present disclosure. The processor TN110 may control each component of the computing device TN100.

The memory TN130 and the storage device TN140 may respectively store various information related to the operation of the processor TN110. The memory TN130 and the storage device TN140 may respectively be configured as at least one of a volatile storage medium and a non-volatile storage medium. For example, the memory TN130 may include at least one of a ROM (read only memory) and a RAM (random access memory).

The transmitting and receiving device TN120 may transmit or receive a wired signal or a wireless signal. The transmitting and receiving device TN120 is connected to a network and may perform communication.

Meanwhile, the present disclosure may be implemented as a computer program. The present disclosure may be combined with hardware and may be implemented as a computer program stored in a computer readable recording medium.

Methods according to embodiments of the present disclosure may be implemented in a readable program form by various computer means and may be recorded on a computer readable recording medium. Here, the recording medium may include a program command, a data file, a data structure, and so on, alone or in combination.

The program command recorded on the recording medium may be specially designed and configured for the present disclosure, or may be known and used by those skilled in the computer software field.

For example, the recording medium includes a hardware device specially configured to store and execute the program command such as magnetic media such as a hard disk, a floppy disk, and a magnetic tape, optical media such as a CD-ROM and a DVD, magneto-optical media such as a floptical disk, a ROM, a RAM, or a flash memory.

Examples of the program commands include machine code, such as code created by a compiler, and high-level language code executable by a computer using an interpreter.

These hardware devices may be configured to operate as one or more software modules in order to perform the operation of the present disclosure, and the vice versa.

While an embodiment of the present disclosure has been described with reference to the accompanying drawings, it will be apparent to those skilled in the art that various modifications and variations can be made through addition, change, omission, or substitution of components without departing from the spirit and scope of the disclosure as set forth in the appended claims, and these modifications and changes fall within the spirit and scope of the present disclosure as defined in the appended claims.

What is claimed is:

1. A hybrid panel abnormality diagnosis system comprising:
   a solar photovoltaic panel configured to generate electrical energy by receiving sunlight;
   a solar thermal panel formed on a lower portion of the solar photovoltaic panel, the solar thermal panel including a refrigerant flow path where a refrigerant flows, the refrigerant flow path having an inlet port and an outlet port and being formed by a plurality of longitudinal flow paths and a plurality of transverse flow paths connected to each other to form a lattice shape, the solar thermal panel having a temperature sensor unit comprising a first temperature sensor at the inlet port configured to measure a temperature of refrigerant entering the refrigerant flow path, a second temp of at the outlet port configured to measure a temperature of refrigerant leaving the refrigerant flow path, and a communication device configured to transmit the measured first and second temperature values; and
   an abnormality diagnosis server including a processor configured to determine, by comparing a refrigerant temperature difference between the first and second temperature values with reference information for an abnormality diagnosis, whether the solar photovoltaic panel is abnormal.

2. The hybrid panel abnormality diagnosis system of claim 1, wherein the communication device comprises a wireless transmitter configured to send the first and second temperature values to the abnormality diagnosis server.

3. The hybrid panel abnormality diagnosis system of claim 1, wherein the abnormality diagnosis server further comprises
   a memory configured to store reference information for an abnormality diagnosis,
   wherein the processor of the abnormality diagnosis server configured to calculate a difference between the first temperature value and the second temperature value and to compare the difference with the reference information, thereby diagnosing whether the solar photovoltaic panel is abnormal.

4. The hybrid panel abnormality diagnosis system of claim 3, wherein the reference information is a range of an average value of the difference in refrigerant temperature obtained by repeatedly measuring the difference in refrigerant temperature of a plurality of solar photovoltaic panels that are normal, and is statistical information obtained through repeated experiments.

5. A hybrid panel comprising:
   a solar photovoltaic panel configured to generate electrical energy by receiving sunlight; and
   a solar thermal panel formed on a lower portion of the solar photovoltaic panel, the solar thermal panel including a refrigerant flow path where a refrigerant flows, the refrigerant flow path having an inlet port and an outlet port and being formed by a plurality of longitudinal flow paths and a plurality of transverse flow paths connected to each other to form a lattice shape, the solar thermal panel having a temperature sensor unit comprising a first temperature sensor at the inlet port configured to measure a temperature of the refrigerant entering the refrigerant flow path and a second temperature sensor at the outlet port configured to measure a temperature of the refrigerant leaving the refrigerant flow path, wherein the temperature sensor unit is configured to measure a difference in refrigerant temperature between the inlet port and the outlet port, and the solar thermal panel having an abnormality diagnosis unit including a processor configured to determine, by comparing the refrigerant temperature difference between the first and second temperature values with reference information, whether the solar photovoltaic panel is abnormal.

6. The hybrid panel of claim 5, wherein the
   abnormality diagnosis server further comprises a memory configured to store reference information for an abnormality diagnosis,
   wherein the processor of the abnormality diagnosis server is configured to calculate difference between the first temperature value and the second temperature value and configured to compare the difference with the reference information, thereby diagnosing whether the solar photovoltaic panel is abnormal.

7. The hybrid panel of claim 6, wherein the reference information is a range of an average value of the difference in refrigerant temperature obtained by repeatedly measuring the difference in refrigerant temperature of a plurality of solar photovoltaic panels that are normal, and is statistical information obtained through repeated experiments.

* * * * *